Oct. 16, 1934.  F. H. McCORMICK  1,977,395
TEMPERATURE CONTROL DEVICE
Original Filed Nov. 17, 1931

Inventor:
Francis H. McCormick,
by Harry E. Dunham
His Attorney.

Patented Oct. 16, 1934

1,977,395

UNITED STATES PATENT OFFICE 1,977,395

TEMPERATURE CONTROL DEVICE

Francis H. McCormick, Glen Ellyn, Ill., assignor to General Electric Company, a corporation of New York Original application November 17, 1931, Serial No. 575,593. Divided and this application May 12, 1934, Serial No. 725,339

4 Claims. (Cl. 200—139)

My invention relates to temperature control devices, more particularly to devices for controlling an electric circuit in accordance with temperature changes, and it has for its object the provision of an improved device of this character.

In general my invention relates to temperature responsive devices such as described and claimed in U. S. reissue patent to A. Lewerenz, No. 16,654, dated June 14, 1927, and more specifically relates to improvements in the temperature control device described and claimed in U. S. patent to A. H. Simmons, No. 1,743,073, dated January 7, 1930. The temperature control devices disclosed in these patents comprise a bimetallic thermostat bar fixed at one end and having its other end free to move in response to changes in temperature. These movements of the bimetallic bar are utilized to control a switch arm or other suitable control member. Bearing on the movable end of the bimetallic bar is an elastic member arranged to cause the bar to move quickly from one position to another and thereby give the switch a snap action in opening and closing the circuit which it controls.

My invention contemplates the provision of improved operable connection means between the switching means and the bimetallic thermostat bar, whereby a more rugged, and a more reliable and efficient device is obtained.

In carrying out my invention in one form thereof, I provide a bimetallic thermostat bar having one of its ends fixed and its other end movable laterally in response to changes in temperature. An elastic member is arranged to apply a force to the movable end of the bar so as to cause the bar to move quickly from one position to another. I further provide a comparatively rigid and mechanically strong switch control arm, and arrange a loose connection between the control arm and the bimetallic thermostat bar whereby these members have limited freedom of movement with respect to each other. Preferably, suitable elastic means will be provided for biasing the control arm to its switch closing position. By reason of the foregoing arrangement the bimetallic bar in its switch opening movement will acquire considerable velocity before the contact arm is actuated to open the switch.

This application is a division of my copending application, Serial No. 575,593, filed November 17, 1931.

Figure 1:
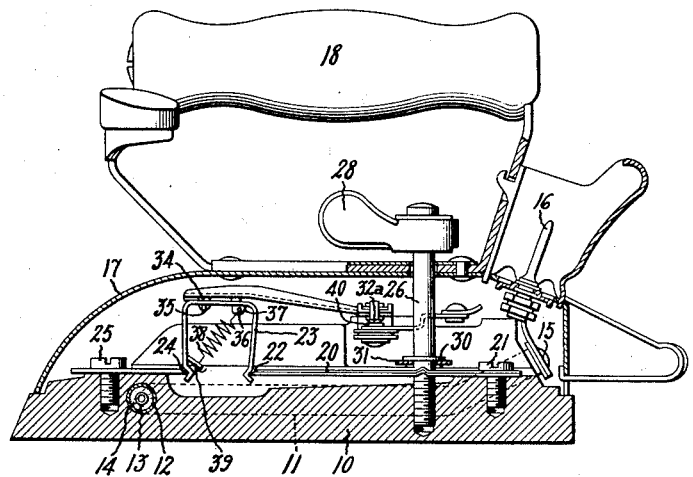
Figure 2:
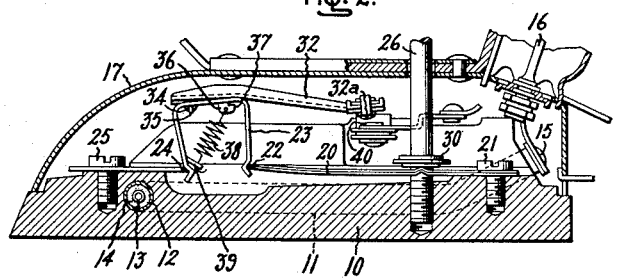
Figure 3:
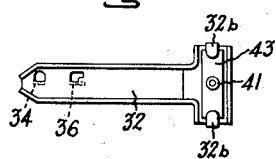
Figure 4:
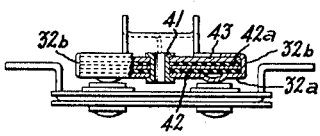

For a more complete understanding of my invention, reference should be had to the accompanying drawing in which Fig. 1 is a vertical elevation mainly in section of a temperature control device embodying my invention; Fig. 2 is a fragmentary view in section illustrating certain of the elements of the control device of Fig. 1, but in different operative positions; Fig. 3 is a plan view of the switch control arm used in the control device of Figs. 1 and 2; and Fig. 4 is an enlarged view in elevation illustrating switch contacts used in the control device of Figs. 1 and 2, parts being shown in section so as to illustrate certain structural details.

Referring to the drawing, I have shown my invention in one form as applied to a temperature responsive device intended to control the heating current of an electrically heated flat-iron, although it is to be understood that my invention is not limited thereto.

As shown, the flat-iron comprises a comparatively heavy body member 10 made of a suitable heat conducting material, such as cast iron, within which is cast a suitable electric heating element 11. Athough any suitabe heating element may be used, preferably a heating element of the type described and claimed in the Abbott Patent No. 1,367,341, dated February 1, 1921, will be used. This unit comprises an outer metallic sheath 12 suitably shaped, and in which a helical resistor 13 is embedded in a suitable powdered heat refractory insulating material 14, such as magnesium oxide. The unit is shaped roughly in the form of a horse-shoe extending throughout a substantial portion of the body member 10. The terminals 15 of the heating element are brought out at the heel of the iron and are electrically connected with suitable contact pins 16 which are arranged, as is well understood by those skilled in the art, to receive the plug receptacle of a suitable supply conductor.

As shown, the upper portion of the body member 10 is enclosed by a suitable cover 17 which will be secured to the body member by some suitable means such as screws (not shown). The iron is further provided with a suitable handle 18 secured to the cover 17.

The temperature control device comprises a bimetallic thermostat bar 20 made of two strips of metal having dissimilar temperature coefficients of expansion, such as iron and steel, the strips being securely brazed or welded together lengthwise. The bar 20 is rigidly secured at one end to the body 10 by means of a clamping screw 21. The other end, that is the movable end of the bimetallic bar, is provided with a knife-edge bearing 22 which rests in a bearing seat provided for it in one arm of an inverted U-shaped resilient member or spring 23. The other arm of this spring member is seated on a fixed knife-edge bearing 24. This fixed bearing is adjustably secured to the body member 10 of the iron by means of a pair of screw members 25 disposed on opposite sides of it (only one screw 25 being shown in the drawing).

A temperature adjustment rod or shaft 26 is provided, the lower end of this rod being passed through an aperture provided for it in the bimetallic bar 20 and received in threaded engagement in the body member 10. The upper end of this rod passes to the exterior of the iron through the cover member 17. To the exposed end of the rod is secured a suitable operating handle 28. The rod 26, as shown, is provided with a suitable collar 30 which bears on a suitable thrust plate 31 which in turn bears on the bimetallic bar 20. It will be understood that the bimetallic bar 20 by reason of its resiliency forces the thrust plate 31 against the abutment 30 and that the position of the bar is determined by adjustment of the screw 26.

The switch operating means comprises a substantially rigid arm 32 carrying on one end a movable or bridging contact 32a. The other end of the arm 32 is pivotally secured to the middle portion of the U-shaped spring member 23 whereby limited freedom of movement is allowed between these members. As shown, the switch arm 32 has depending therefrom a lug or ear 34, which is received in a suitable aperture provided for it in the base portion of the spring member 23 so that it projects through the spring member to the under side thereof. The portion projecting under the spring member is provided with an aperture through which a suitable retaining pin 35 is passed and secured to prevent vertical displacement of the switch arm.

The switch arm 32 is provided with a second depending lug 36, this lug being passed through an aperture provided for it in the forward end of the middle portion of the U-shaped spring member and having on its under side a locking abutment 37. The portion of the lug 36 between the switch arm 32 and the abutment 37, as shown, is somewhat longer than the lug 34 so as to provide for some pivotal movement between the switch arm and the spring member. The switch arm is normally biased toward the spring member by means of a tension spring 38 having one end secured to the lug 36 and extending diagonally across the spring member to the other side where its other end is secured to a suitable lug 39 provided on the spring member.

The movable contact 32a cooperates with suitable fixed contacts 40 rigidly secured to the base 10 of the iron. It will be understood that the fixed contacts 40 will be suitably insulated from the base 10.

The bridging contact 32a, as shown, is secured to the contact arm 32 by means of an eyelet 41 (Figs. 3 and 4), a suitable sheet 42 of insulating material, such as mica, being interposed between the arm 32 and the bridging contact member. Arranged on the other side of the contact arm 32 is a similar sheet 42a of insulating material and on this is placed a suitable metallic sheet of material 43. The end portions 32b of the bridging contact member, as shown (Figs. 3 and 4), are bent upwardly and about the mica insulating sheets, the switch member 32 and the metallic sheet 43 so as to clamp these members together and to secure the contact member 32a to the switch arm.

In the operation of the control device, it will be understood that the U-shaped spring 23 functions to move or snap the bimetallic bar 20 quickly between its controlling positions on opposite sides of a neutral position, as pointed out in more detail in the above-mentioned Simmons patent. The bridging contact 32a will be held in engagement with the fixed contacts 40 to maintain the heating circuit closed, as shown in Fig. 1, as long as the temperature of the heating plate 10 is below a predetermined maximum value. Under this condition, the movable end of the thermostat is situated below its neutral position. As the temperature increases the distortion of the thermostat tends to move its free end upward. This motion is resisted by the operation of the resilient member 23 until the occurrence of a predetermined maximum temperature, whereupon the thermostat has sufficient force to overcome the spring and it starts to move upwardly. As the thermostat moves upwardly, the spring 23 decreasingly resists its motion, and the result is that the thermostat rapidly accelerates and moves at a high speed through its neutral position to the opposite side thereof, where it is urged rapidly upward by the increasing lateral component of force applied by the spring 23. The heating circuit is thus quickly opened, the bridging contact 32a being thrown upward with a snap action to its position shown in Fig. 2. This snap action is further assured by the flexible connection between the switch operating arm 32 and the resilient spring member 23. Thus, it will be observed that the initial slow retarded motion of the bimetallic bar 20 is absorbed by the loose connection between the arm 32 and the spring before the arm 32 is engaged by the spring to open the switch contacts. In other words, the loose connection between the switch arm 32 and the spring member 23 will be such that the bimetallic bar will have an opportunity to accelerate to a high speed before the switch arm is engaged to open the contacts.

After the heating circuit has been opened and the temperature of the device and consequently the temperature of the thermostat begins to decrease, the thermostat tends to move back to its closed circuit position. Its movement in this direction is opposed by the force exerted by the spring member 23, this force being overcome at some predetermined minimum temperature when the thermostat will snap to close the switch.

During the closing movement the bridging contact 32a will engage the stationary contacts 33 somewhat before the bimetallic bar has been moved to its closed circuit position shown in Fig. 1, further movement of the bimetallic bar being permitted by the loose connection provided between the switch arm 32 and the spring member 23.

The loose connection between the arm 32 and the spring 23 also has the advantage that it causes the contacts to move into and out of engagement with a wiping action thereby preventing the accumulation of dirt or other deposits on either the movable or the stationary contacts.

The temperature setting of the control device is adjusted by means of the rod 26, whereas the range between the maximum temperature at which the circuit is opened and the minimum temperature at which it is closed is adjusted by means of the fixed bearing member 24.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A temperature control device comprising a support, a bimetallic thermostat bar secured at one end to said support and its other end movable in response to changes in temperature, a pivot on said support adjacent the movable end of said bar, a U-shaped spring member having one arm bearing on said pivot and its other end bearing on said movable end of said bar, a contact arm, means pivotally connecting said contact arm to the central portion of said U-shaped spring member comprising a lug secured to said arm and projecting through an aperture provided for it in said spring member, retaining means arranged to prevent the withdrawal of said lug, a second lug on said arm projecting through a second aperture provided for it in said spring member, retaining means preventing the withdrawal of said second lug but providing for limited relative movement between said arm and said spring member and a second spring member secured to said second lug and attached to one of the arms of said U-shaped spring member so as to bias said contact arm in one direction relative to said U-shaped spring member.

2. A temperature control device comprising a thermostat bar, an elastic member operably associated with said thermostat bar arranged to cause said bar to move quickly from one position to another, a substantially rigid control member actuated by said thermostat bar, pivotal means connecting said control arm to said elastic member providing for limited relative movement between said members and a spring connected at one end to said control arm and at its other end to said elastic member biasing said arm to one of its limiting positions relative to said elastic member.

3. A temperature control device comprising a support, a thermostat bar secured to said support, a U-shaped spring member having one end bearing on said bar so as to cause said bar to move quickly between its controlling positions, a control member, means pivotally connecting said control member directly to the base of said spring member so as to provide for limited relative movement between said members, a tension spring embraced by the legs of said U-shaped spring member, means connecting one end of said tension spring to one of the legs of said U-shaped spring member and its other end to said control member.

4. A temperature control device comprising a support, a thermostat bar secured to said support, a U-spring having one end bearing on said bar so as to cause said bar to move quickly between its controlling positions, a rigid metallic switch arm, a pivotal connection between said switch arm and the base of said U-spring providing for limited relative movement between said members, said base being provided with an aperture, a member secured to said switch arm passing through said aperture and a spring connected to said member projecting through said aperture and to one arm of said U-spring so as to bias said switch arm in one direction relative to said U-spring.

FRANCIS H. McCORMICK.